(12) United States Patent
Hedrick et al.

(10) Patent No.: US 6,369,942 B1
(45) Date of Patent: Apr. 9, 2002

(54) AUTO-ALIGNMENT TRACKING TELESCOPE MOUNT

(76) Inventors: Rick Hedrick, 1111 W. 10th St., #A, San Pedro, CA (US) 90731; Manishi Gupta, 3351 Rossmoor Way, Los Alamitos, CA (US) 90720; James Barnaby, 4537 Gundry Ave., Long Beach, CA (US) 90807

( * ) Notice: Subject to any disclaimer, the term of this patent is extended or adjusted under 35 U.S.C. 154(b) by 113 days.

(21) Appl. No.: 09/604,410

(22) Filed: Jun. 27, 2000

(51) Int. Cl.[7] ................................................ G02B 23/00
(52) U.S. Cl. .................. 359/430; 359/432; 359/403; 359/822; 359/809; 342/359; 342/357.06; 342/357.08; 701/220
(58) Field of Search ............................... 359/809, 822, 359/823, 399, 421, 403, 430, 432; 342/357.06, 352, 359, 357.08; 701/220; 725/72

(56) References Cited

U.S. PATENT DOCUMENTS

| | | | |
|---|---|---|---|
| 5,347,286 A | 9/1994 | Babitch | 342/359 |
| 5,446,465 A | 8/1995 | Diefes et al. | 342/357.08 |
| 5,537,250 A * | 7/1996 | Masunaga et al. | 359/430 |
| 5,574,465 A | 11/1996 | Okada | 342/352 |
| 5,809,457 A | 9/1998 | Yee et al. | 701/220 |
| 5,907,433 A * | 5/1999 | Voigt et al. | 359/432 |
| 5,956,177 A * | 9/1999 | Nishikata et al. | 359/430 |
| 5,983,071 A | 11/1999 | Gagnon et al. | 725/72 |
| 6,016,120 A | 1/2000 | McNabb et al. | 342/357.06 |
| 6,049,306 A | 4/2000 | Amarillas | 342/359 |

* cited by examiner

*Primary Examiner*—Loha Ben
(74) *Attorney, Agent, or Firm*—Patton Boggs LLP

(57) ABSTRACT

A mounting and tracking system for telescopes receives date, time, and geographical position data and, in response, automatically selects and points the telescope to a first alignment star. The user completes the exact centering of the first alignment star. Based on the date, time, and geographical position data, the telescope automatically selects and points to a second alignment star. After the user completes the exact centering of the second alignment star the system automatically points to and tracks any of a large number of celestial bodies.

7 Claims, 3 Drawing Sheets

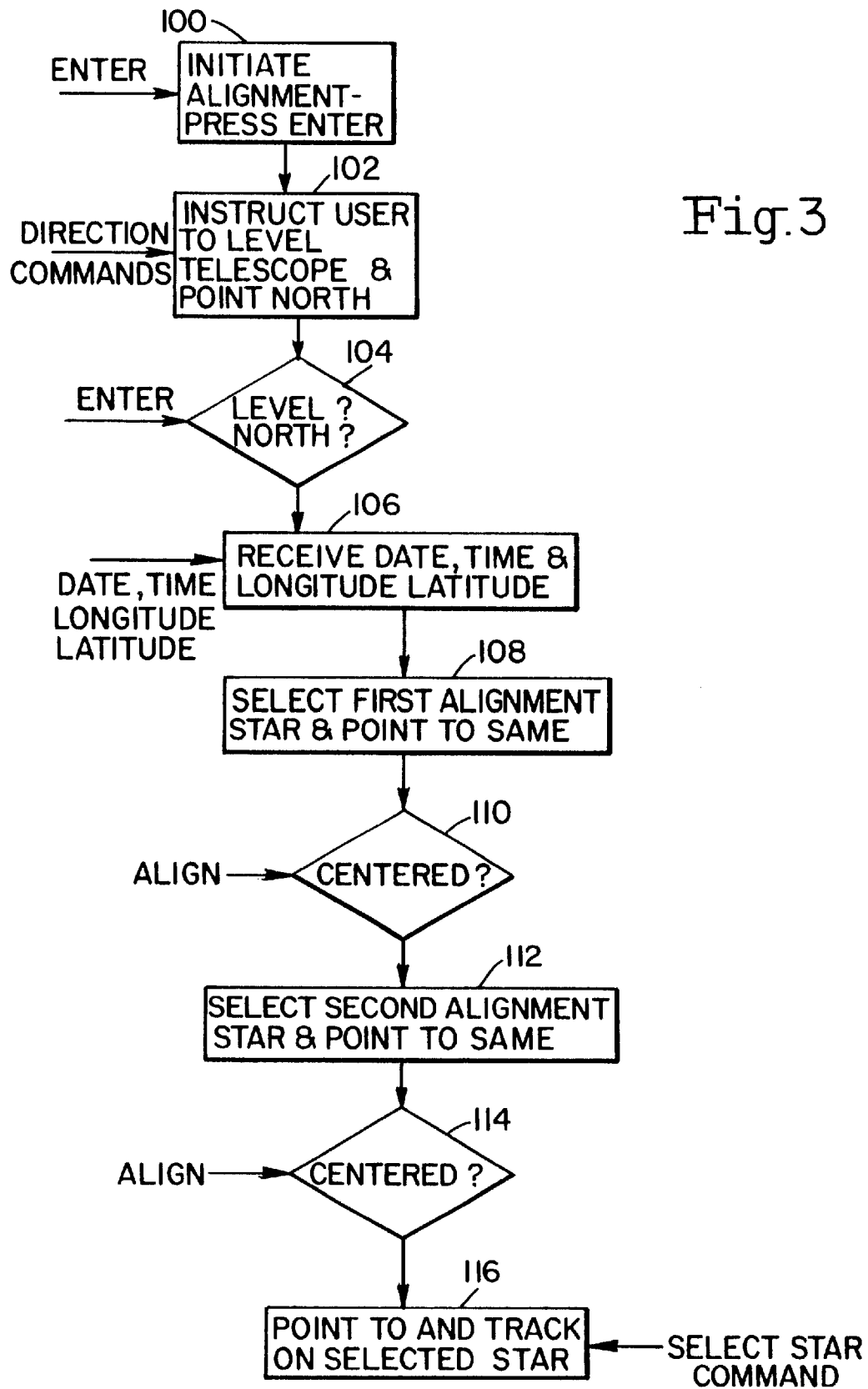

AUTO-ALIGNMENT TRACKING TELESCOPE MOUNT

FIELD OF THE INVENTION

This invention relates generally to the field of optical telescopes and, more particularly, to an automatic alignment and tracking telescope apparatus and method for automatically aiming to and tracking any of a pre-determined plurality of celestial points.

DESCRIPTION OF THE RELATED ART

Telescopes for viewing of celestial bodies employ various known arrangements of lenses and mirrors to gather light from a selected light source, typically a star, and project the gathered light onto an image plane with significant magnification. Under well-known principles of optics, however, the effective field of view across the image plane in inversely proportional to the magnification. Therefore, at high magnifications, the image plane may be very small. This poses a problem when the user of the telescope wishes to view a particular star because, due to the rotation of the earth, the star will appear to move across the image plane and be lost from sight within seconds of being at the center of the image plane. Such motion, if not compensated by a counter-motion of the telescope, is more than merely frustrating to the viewer, it would render taking a photograph of any star image impossible. Further, many star images are so faint that they are not visible to the naked eye and, therefore, can be seen only by a substantial time exposure of the faint light onto the film. If the telescope were unable in track with the rotation of the earth to maintain a fixed image point on the film, such time exposure would be impossible.

For this reason various alignment and tracking mechanisms have been known in the art. All, however, have shortcomings.

One known alignment and tracking mechanism is the Celestron® Compustar®. The Compustar® has a single axis drive motor and operates as follows:

First the power is turned on and the on-board processor is initialized. The initialization causes the telescope tube to point to a center reference of the drive base. Next, the user manually aligns the telescope forks toward Polaris, otherwise known as the "north star". The user then enters, through a keypad means, the Greenwich Mean Time ("GMT") and the longitude and latitude of the telescope position. Since the telescope forks have been aligned toward the north star, the on-board processor has sufficient data to point the telescope to Polaris, which it does. Due to various factors, including mechanical clearances and backlash, approximation of the longitude and latitude, and initial pointing error of the telescope forks, the automatic pointing toward Polaris is not perfect. The user must therefore center Polaris in the finderscope and eyepiece. The centering allows the Compustar® telescope to more accurately track star images after the alignment procedure is completed.

After centering Polaris the user press a keypad button whereupon the on-board computer generates signals which cause the telescope drive motor to point the tube to a second alignment star. As with the operation of pointing the tube toward Polaris, however, the pointing to the second alignment star is not perfectly centered. The user therefore manually centers the second alignment star in the finderscope and eyepiece and enters a "complete" command through the keypad. The Compustar can then track essentially any star image in the sky that the user selects.

The Celestron® Compustar® system and single axis drive, although a significant partial solution to the known problems of telescope mounting and tracking methods, lack features identified by the present inventors.

SUMMARY OF THE INVENTION

An object of the present invention is to provide a portable, economical, stable and easy to use apparatus for aligning, aiming and tracking a telescope on any celestial body selected by the user.

An embodiment of the invention comprises a tripod, quadrapod or similar structure for supporting a movable mount at a given height above ground, the movable mount having structure for securely attaching a telescope aligned with a pointing axis. The telescope has an eyepiece for viewing a focussed image collected by the telescope, and a finderscope for alignment purposes. The embodiment further includes at least two servo motors for moving the movable mount along two axes of movement. The embodiment also has a microprocessor for calculating and generating control signals for the servo motors, a program memory and a star data memory, a manual data entry key pad for inputting commands and data into the processor, and a display means.

A further embodiment includes a level-indicating device to detect the pointing axis of the tube being level with respect to ground, i.e., the plane tangential to earth at the location of the supporting structure. A still further included is a compass for indicating the azimuth angle of the tube pointing axis with respect to North.

Before operating the automatic alignment apparatus and method of the invention, the user first levels the telescope tube with respect to ground, using the level-indicator, and points the telescope tube north using the compass.

The user then enters the following data, through a keypad device connected to the apparatus's controller: the date, the local time, and the longitude and latitude where the user and the telescope are located. The user then enters a start command, by pressing an "ENTER" key or equivalent, via the manual data entry pad and, in response:

1. The processor retrieves a position data for a first bright star from pre-loaded star data memory;
2. The processor calculates the servo control signals for pointing the telescope to the first bright star, based on the retrieved position data, the local data and time, and the longitude and latitude entered by the user;
3. In response, the generated servo control signals the servos automatically point the telescope to the first bright star; and
4. The processor generates a audible or visual signal indicating to the user to center the star in the finderscope and eyepiece.

The user centers the first bright star in the eyepiece viewing field and presses an "ALIGN" or equivalently named button. In response, the processor:

5. Retrieves a position data for a second bright alignment star from the pre-loaded star data in memory;
6. Calculates and generates the servo control signals for pointing the telescope to the first bright star, based on the retrieved position data, the local data and time, and the longitude and latitude entered by the user;
7. In response to the generated servo control signals, the servos automatically point the telescope to the second bright alignment star; and
8. The processor generates a audible or visual signal indicating to the user to center the second bright star in the finderscope and eyepiece.

The user then centers the first bright star in the eyepiece viewing field and presses a START button again. The processor then generates a audible or visual signal indicating to the user that the alignment is complete.

After the alignment is complete the user enters a star identification number for any of the large number of stars stored in the star data. In response, the controller generates servo control signals which operate the servos to align the telescope on the selected star and to track the star to compensate for the rotation of the earth.

BRIEF DESCRIPTION OF THE DRAWINGS

The foregoing and other objects, aspects, and advantages will be better understood from the following description of preferred embodiments of the invention with reference to the drawings, in which:

FIG. 3 is a flow chart of a method for pointing to and tracking celestial objects using the telescope system of FIG. 1.

DETAILED DESCRIPTION OF THE INVENTION

The system and method of this invention will be described with reference to FIGS. 1–4 herein.

Figure 1:
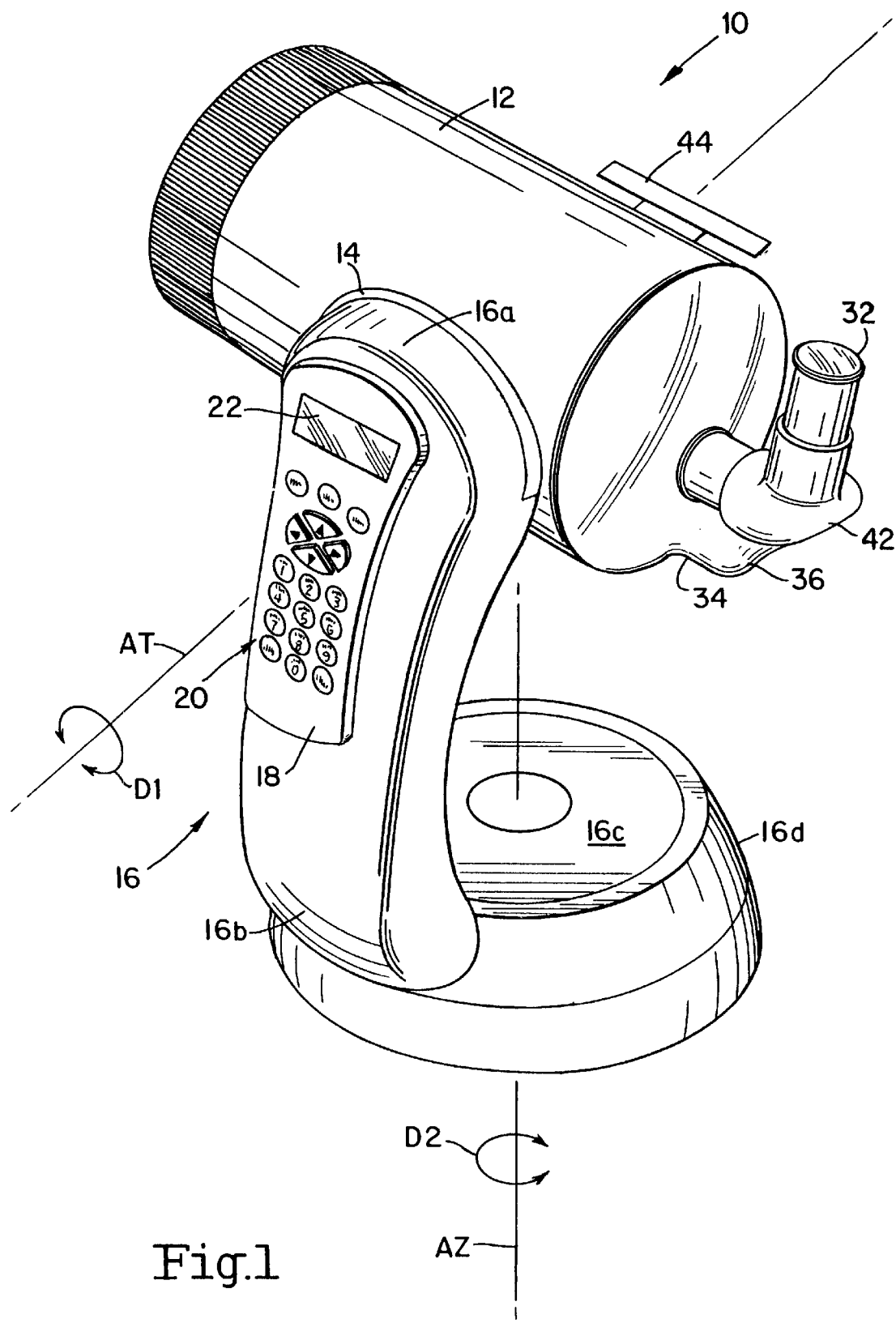
FIG. 1 is a perspective view of the telescope system of this invention.

FIG. 1 represents an example telescope system 10 in accordance with this invention. In this embodiment, telescope system 10 includes an optical telescope 12 attached to a mounting disc 14 which is connected to an upper rotatable support 16a of a vertical support, or arm, 16. The lower end 16b of the vertical support 16 connects to an upper base plate 16c. The upper base plate 16c is rotatably supported by a lower base plate 16d. The lower base plate 16d is supported at a height ranging from two to four feet above the ground by a tripod or equivalent support structure (not shown). A first servo motor (not shown) rotates the mounting disc 14 in relation to the upper vertical support 16a in the directions D1 around altitude axis AT. A second servo motor (not shown) rotates the upper base plate 16c in relation to the lower base plate 16d in the directions D2 about azimuth axis AZ.

Figure 4:
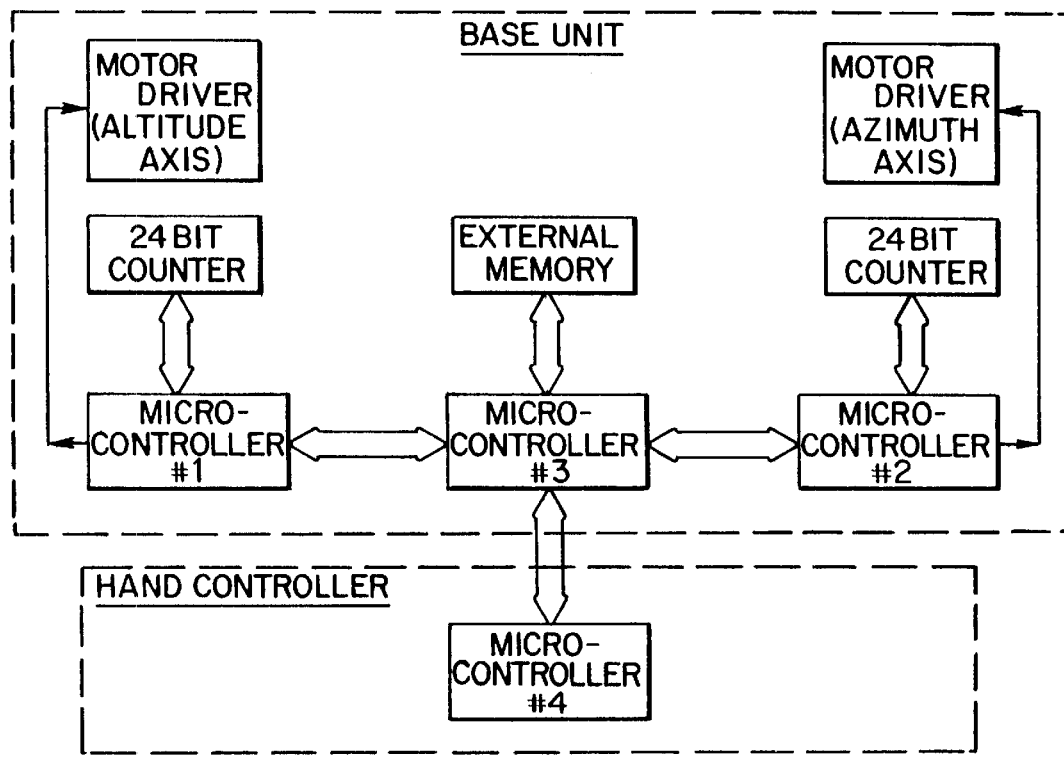
FIG. 4 is a functional block diagram for the telescope system of FIG. 1.

Attached, or removably mounted to the vertical support 16 is a user input device in the form of a hand controller 18 having a key pad 20 and a display in the form of a Liquid Crystal Display LCD 22. Referring to FIG. 4, the example system 10 further includes a processor 28 and a database memory 30. A basic example system 10 employs a user-provided compass (not shown) and user-provided level. A further contemplated embodiment includes a compass (not shown) and level (not shown) is not necessary to the invention that the compass and level be mounted or attached to the optical telescope 12, although such mounting may be preferable for convenience.

As shown in FIG. 1, an eyepiece 32, a visual back 34 and a focuser knob 36 are disposed on one end of the telescope 12.

Apparatus 10 further includes a power switch (not shown) and a battery compartment (not shown), both of which are preferably located in the base member 16d.

As further shown in FIG. 1, system 10 preferably includes a star diagonal 42 and a finderscope 44 disposed on the telescope 12.

The star diagonal 42 is desirable because it diverts light at a right angle from the light path of the telescope. For astronomical observing, this allows the user to observe in positions which are more comfortable than if the user were to look straight through.

The finderscope 44, although not essential to the invention, is preferable because it provides a quick and easy way to point the telescope 12 exactly at a desired object in the sky. The finderscope 44, in accordance with the current state of the art, is a zero magnification pointing tool that uses a coated glass window (not shown) to superimpose the image of a small red dot (not shown) onto the night sky. The finderscope is easy to use. While keeping both eyes open when looking through the finderscope, the user simply moves the telescope until the red dot, seen through the finderscope, merges with the object as seen with the unaided eye. The red dot is produced by a light-emitting diode (LED) (not shown). As known in the art, a finderscope such as that of item 44 generally comes equipped with a variable brightness control, two axes alignment control and a quick-release dovetail mounting bracket.

The eyepiece, or ocular, 32 is the optical element that magnifies the image focused by the telescope. Eyepiece 32 may fit either into visual back 34 directly or, if present, into star diagonal 42. A non-limiting example of a suitable eyepiece for use in the present invention is a 25 mm Plossl Eyepiece (1¼ inch).

Figure 2:
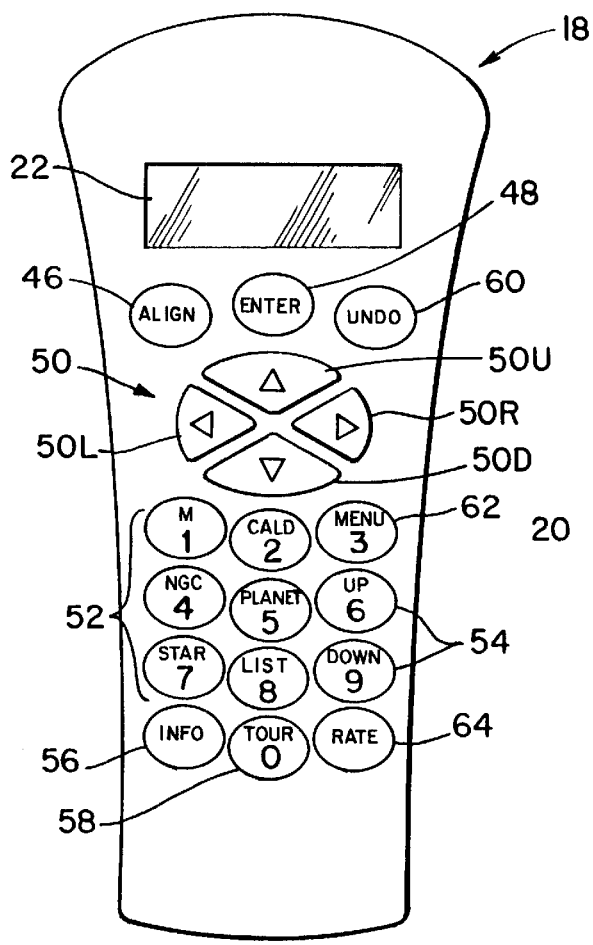
FIG. 2 is a front view of the hand controller used in the telescope system of FIG. 1.

As shown in FIGS. 1 and 2, hand controller 18 generally includes a display means in the form of an LCD window 22 and a key pad 20. The LCD window 22 displays instructions and information to the user transmitted by the processor in accordance with the program executed in response to input entered by the user through the key pad. The key pad 20 includes a plurality of keys which allow the user to input commands or data into the system. In the embodiment shown in FIGS. 1 and 2, key pad 20 includes an ALIGN key 46, an ENTER key 48, DIRECTION keys 50, CATALOG keys 52, SCROLL keys 54, INFO key 56, a TOUR key 58, an UNDO key 60, a MENU key 62, and a RATE key 64.

An example of the functions of keys 46–64 on key pad 20 of the hand controller are set forth below:

ALIGN key 46—pressing this key instructs the system's processor to use a selected celestial object as an alignment position.

ENTER key 48—pressing this key allows the user to select any of the functions of the telescope system and to accept entered parameters.

DIRECTION keys 50—pressing these keys allows complete control of the telescope in any direction; these keys can be used to point the telescope to the alignment celestial bodies and for centering the celestial objects in the eyepiece.

CATALOG keys 52—pressing these keys gives the user direct access to each of the catalogs in the system's celestial object database.

SCROLL keys 54—these keys are used to scroll up and down within any of the menu lists.

INFO key 56—pressing this key displays coordinates and useful information about celestial objects selected from the system's database.

TOUR key 58—pressing this key activates the tour mode, which seeks out all the best celestial objects for viewing in a given month and automatically slews the telescope to those celestial objects.

UNDO key 60—pressing this key will take the user out of the current menu and will display the previous level of the menu path.

MENU key 62—pressing this key displays the many setup and utilities functions such as tracking rate and user-defined objects and many others.

RATE key 64—pressing this key instantly changes the speed of the motors when the DIRECTION keys are pressed.

An example operation of this embodiment of the invention will be described, in reference to FIG. 3. The described operation assumes that the user has powered the unit 10 on, via the power switch 38.

Referring to FIG. 3, the user initiates the alignment process at step 100 by pressing the ENTER key 48 on key pad 20. The processor 28 detects the ENTER key and, in response, goes to step 102 and generates an LCD control signal causing the LCD window 22 to display words instructing the user to level telescope 12 with the ground, and to point the telescope 12 north. For this embodiment, the leveling is carried out by the user pressing the DIRECTION buttons 50, in particular the ALTITUDE UP button 50u and ALTITUDE DOWN button 50d shown in FIGS. 1 and 2, and moving the telescope until it is horizontal to the ground. Similarly, the telescope 12 is pointed north by pressing the AZIMUTH LEFT 50L and AZIMUTH RIGHT button 50r until, based on the compass, the tube is pointed north.

After leveling the telescope with the ground and pointing it north, the user again presses the ENTER key, which is detected at step 104. In response, the processor 28 goes to step 106, displays an instruction requesting the user to enter the local DATE, the local TIME, the LONGITUDE and LATITUDE where the telescope is situated. A table (not shown) of longitude and latitude is preferably provided for the user's convenience. After the TIME, LONGITUDE and LATITUDE are entered the processor goes to step 108, determines the location of a first alignment celestial body (not shown), and sends a command signal to the mounting structure to rotate the telescope 12 in accordance with the determination, points to a first bright star, i.e., the "first alignment star", and generates an LCD control signal causing a message to appear in the LCD window 22 instructing the user to center the first alignment celestial body, or star, in the eyepiece 32 of telescope 12. For this embodiment, the centering is accomplished by using direction keys 50 to slew telescope 12 to the celestial body.

Once the celestial body, or star, is centered in the field of view of the eyepiece, the user presses ALIGN key 46 on key pad 20 to accept this position (also referred to herein as "the first alignment position"), which is received at step 110, and the process goes to step 112.

At step 112 telescope 12 automatically moves to a second bright celestial body (i.e., the "second alignment celestial body") (not shown), and the processor generates an LCD control signal causing a message to appear in the LCD window 22, instructing the user to center the second alignment celestial body in eyepiece 32. This is accomplished in the same manner in which the first alignment celestial body was centered.

Once the second alignment celestial body, or star, is centered in the field of view of the eyepiece, the user presses the ALIGN key 46 to accept this position (which is also referred to herein as "the second alignment position"), the ALIGN key being received at step 114.

After the second alignment celestial body has been centered in the field of view of the eyepiece, the telescope system 10 goes to step 116 wherein the user can select from a large number of stellar objects and, in response, the system points to and automatically tracks the selected object.

Generally speaking, the step 116 of selecting a celestial body, or star, to be pointed to and tracked by the telescope involves the user inputting a command through the user input device which is transmitted to the database, the database then sending in response information regarding celestial bodies.

In the embodiment of system 10 shown in FIGS. 1 and 2, step 108 is carried out as follows:

The user may select a celestial object to be tracked from any catalog of stellar object data present in database 30. Key pad 20 has a catalog key 52 designated for each of the catalogs present in the database. Objects from database 30 may be selected by either scrolling through the named object lists using SCROLL keys 54 or by entering object numbers.

Database 30 of telescope system 10 preferably contains the following catalogs:

"Messier"—Complete list of all Messier objects.

"NGC"—Complete list of all the deep-sky objects in the Revised New General Catalog.

"Caldwell"—A combination of the best NGC and IC objects.

"Planets"—All 8 planets in our solar system plus the sun.

"Stars"—A compiled list of the brightest stars from the SAO catalog.

For quick access, all of the best and most popular objects in database 30 are preferably broken down into lists based on their type and/or common name:

"Alignment Stars"—Common name listing of the brightest stars in the sky.

"Named Objects"—Alphabetical listing of over 50 of the most popular deep sky objects.

"Double Stars"—Numeric-alphabetical listing of the most visually stunning double, triple and quadruple stars in the sky.

"Variable Stars"—Select list of the brightest variable stars with the shortest period of changing magnitude.

"Asterisms"—A unique list of some of the most recognizable star patterns in the sky.

An optional feature contemplated by this invention is that the desired object is displayed in LCD display 22, the user may either press INFO key 56 on key pad 20 to gain useful information about the selected object, or press ENTER key 48 to cause the telescope to automatically slew to the coordinates of the selected celestial object.

FIG. 4 is a block diagram of an example circuitry of the processor 28 used in the described embodiment of this invention. For this example, the processor 28 of FIG. 4 uses four separate micro-controllers, labeled 1, 2 and 3, each for different classes of the functional tasks performed by the system. For this example, micro-controllers 1 and 2 are each responsible for driving and maintaining the position of a single axis of the telescope, i.e., rotation in the directions D1 and D2 about the pointing axes A1 and A2 of the telescope. Micro-controller 3 controls access to the database and performs the celestial calculations, and micro-controller 4 performs the display and user inputs.

More specifically, in reference to FIG. 4, micro-controller 1 generates the servo control signal driving and maintaining the position of the telescope's altitude axis AT, while micro-controller 2 the servo control signal driving and maintaining the position of the telescope's azimuth axis AZ. Micro-controllers 1 and 2 maintain positional accuracy through the use of an encoder on the motor shaft. The encoder outputs a quadrature signal that is decoded and tracked by a 24-bit counter. Micro-controllers 1 and 2 command the motors to move by outputting a pulse width modulated signal that is fed to the drive circuitry.

Most calculations of the system are performed by micro-controller chip 3. Micro-controller 3 is also termed as "the guidance controller" 3. The guidance controller 3 performs all of the calculations for alignment, pointing and tracking and is connected to an external ROM so it can access all of the databases. Micro-controller 3 is also responsible for relaying communication between the hand controller and the motor controls.

User interface is accomplished by dedicating micro-controller chip 4 to the task of updating the hand controller's LCD window and scanning the hand controller buttons for user inputs. This design allows for very high button scan rates and display refresh rates. Micro-controller 4 communicates serially with micro-controller chip 3 for all commands and display data.

As described, the present invention provides an improved telescope system and method for automatically pointing to and tracking celestial bodies. While the foregoing invention has been described with specific references to examples of its preferred embodiments, it should be understood that various substitutions, variations, and modifications may be made thereto without departing from the scope of the invention as defined in the appended claims.

Having thus described our invention, what we claim as new and desire to secure by Letters Patent is as follows:

1. An apparatus for supporting and movably aiming a telescope to track celestial objects, comprising:
    a movable telescope mount including
        a base,
        a rotating support structure supported by and rotatable with respect to said base about an azimuth axis, and
        a rotating mount structure movably connected to said rotating support structure, rotatable with respect to said rotating support structure about an altitude axis;
    an azimuth servo motor operatively connected to said rotating support structure;
    an altitude servo motor operatively connected to said rotating mount structure;
    a key pad;
    a display;
    a controller electrically connected to said keypad, to said display and to said azimuth and altitude servo motors, having a digital program storage, an instruction set stored in said digital program storage, a digital data processor for performing instructions in accordance with said instruction set, and a star data storage,
    wherein said instruction set includes instructions for said controller to
        receive time data and position data from said keypad, and
        align said telescope based on said time data and said position data.

2. An apparatus for supporting and movably aiming a telescope to track celestial objects according to claim 1, wherein said instructions to align said telescope include instructions to
    select a first alignment location data, representing a first alignment star, from said star data storage, based on said time data, said position data,
    generate servo control signals to said azimuth and altitude servo motors, based on said first alignment star data, said time and position data,
    receive a first center data from said keypad representing an alignment of an optical axis of said telescope with said first alignment star,
    select a second alignment location data, representing a second alignment star from said star data storage, based on said time data and said position data,
    generate servo control signals to said azimuth and altitude servo motors, based on said second alignment data, said time and position data,
    receive a second center data from said keypad representing an alignment of said telescope optical axis with said second alignment star,
    receive a star selection data corresponding to a selected star represented by said star data, and
    generate control signals to said altitude and azimuth servo motors, for said telescope to align on and track said selected star.

3. An apparatus for supporting and movably aiming a telescope to track celestial objects according to claim 2, wherein said controller comprises:
    a first controller for detecting inputs at said keypad and for generating signals in response;
    a second controller for retrieving data from said data storage and for calculating and generating first azimuth control signals and first altitude control signals based on said generated signals from said first controller, said retrieved data, and said instruction set; and
    a third controller for generating and transmitting control signals to said altitude and azimuth servo motors based on said first azimuth control signals and said first altitude control signals.

4. An apparatus for supporting and movably aiming a telescope to track celestial objects according to claim 1, wherein said controller comprises:
    a first controller for detecting inputs at said keypad and for generating signals in response;
    a second controller for retrieving data from said data storage and for calculating and generating first azimuth control signals and first altitude control signals based on said generated signals from said first controller, said retrieved data, and said instruction set; and
    a third controller for generating and transmitting control signals to said altitude and azimuth servo motors based on said first azimuth control signals and said first altitude control signals.

5. A method for supporting a telescope and movably aiming an optical axis of the telescope to track celestial objects, after the optical axis leveled with respect to ground and pointed north, comprising:
    storing a plurality of star location data points in a digital storage;
    receiving a date data, a time data, and geographic location data;
    storing said date data, said time data, and said geographic location data in a data storage;
    receiving a start alignment command;
    automatically pointing the optical axis of said telescope to a first alignment star in response to said start alignment command, said automatic pointing based on said stored star location data points, said date data, time data, and geographic location data;
    receiving external direction signals and adjusting the optical axis in response;
    receiving a first alignment centered signal indicating that the optical axis is aligned with said first alignment star;

automatically pointing the optical axis of said telescope to a second alignment star in response to said start alignment command, said automatic pointing based on said stored start location data points, said date data, said time data, and said geographic location data;

receiving external direction signals and adjusting the optical axis in response;

receiving a second alignment centered signal indicating that the optical axis is aligned with said second alignment star;

receiving an externally generated star selection command;

automatically pointing the optical axis to a star corresponding to said star selection command; and automatically tracking the optical axis on said star.

6. A method for supporting a telescope and movably aiming an optical axis of the telescope to track celestial objects according to claim 5, wherein said step of automatically pointing the optical axis of the telescope to a first alignment star comprises steps of:

selecting a first alignment star data from the stored plurality of star location data points, based on said stored date data, time data, and geographic location data;

generating a servo motor control signal based on said selected first alignment star data, based on said stored date data, time data, and geographic location data; and moving the optical axis of said telescope to point at said first alignment star, by way of servo motors responsive to said servo motor control signal.

7. A method for supporting a telescope and movably aiming an optical axis of the telescope to track celestial objects according to claim 6, wherein said step of automatically pointing the optical axis of the telescope to a second alignment star comprises steps of:

selecting a second alignment star data from the stored plurality of star location data points, based on said stored date data, time data, and geographic location data;

generating a servo motor control signal based on said selected second alignment star data, based on said stored date data, time data, and geographic location data; and moving the optical axis of said telescope to point at said second alignment star, by way of servo motors responsive to said servo motor control signal.

* * * * *

UNITED STATES PATENT AND TRADEMARK OFFICE
CERTIFICATE OF CORRECTION

PATENT NO. : 6,369,942 B1
DATED : April 9, 2002
INVENTOR(S) : Rick Hedrick, Manishi Gupta and James Barnaby It is certified that error appears in the above-identified patent and that said Letters Patent is hereby corrected as shown below:

Title page,
Item [75], Inventors, please remove the following "Rick Hedrick, Manishi Gupta and James Barnaby" and replace to read as follows: -- Kenneth W. Baun of Irvine, California and John E. Hoot of San Clemente, California --

Signed and Sealed this

Twenty-eighth Day of September, 2004

JON W. DUDAS
*Director of the United States Patent and Trademark Office*